Nov. 16, 1965 TAHIKO HONJYO ETAL 3,217,877
APPARATUS FOR AUTOMATICALLY INSPECTING AMPOULES
Filed Feb. 14, 1963 5 Sheets-Sheet 2
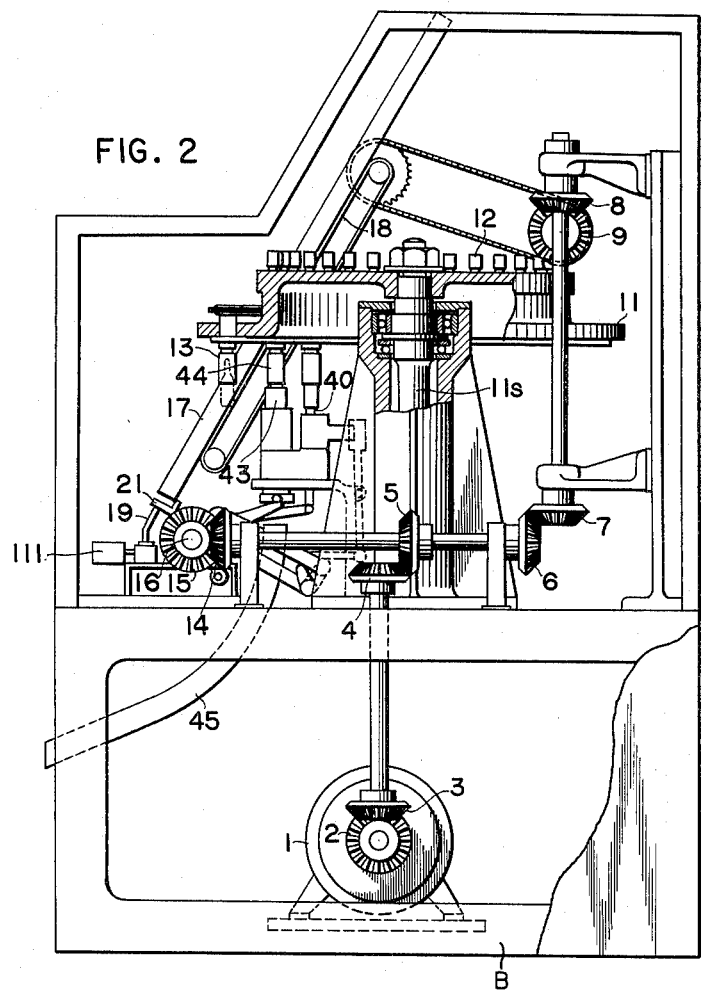
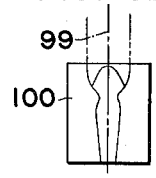
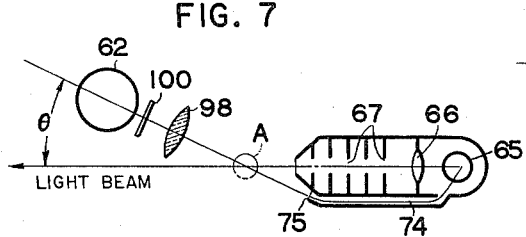
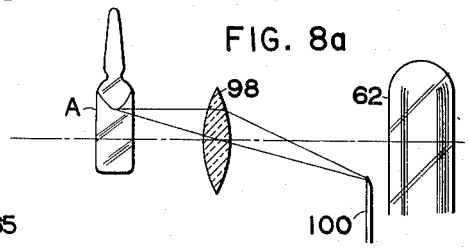

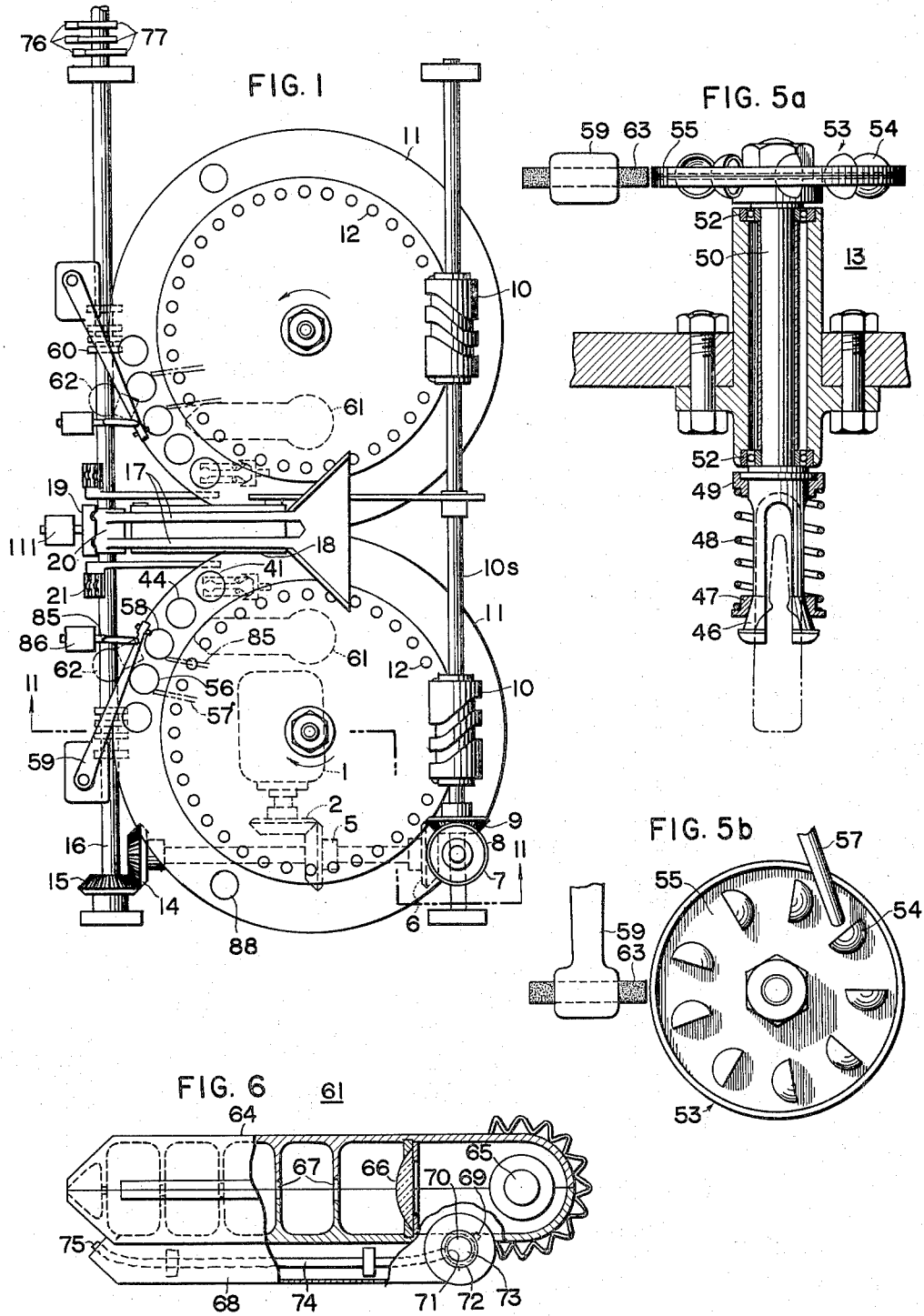

Nov. 16, 1965 TAHIKO HONJYO ETAL 3,217,877
APPARATUS FOR AUTOMATICALLY INSPECTING AMPOULES
Filed Feb. 14, 1963 5 Sheets-Sheet 3

$R_1 \sim R_{10}$ : 50kΩ

Nov. 16, 1965   TAHIKO HONJYO ETAL   3,217,877
APPARATUS FOR AUTOMATICALLY INSPECTING AMPOULES
Filed Feb. 14, 1963   5 Sheets-Sheet 4
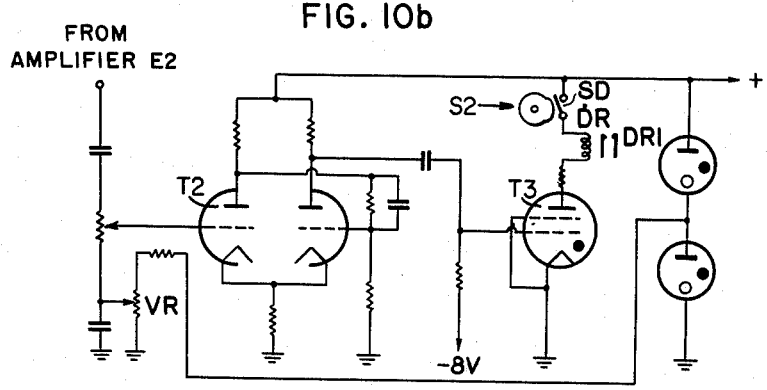
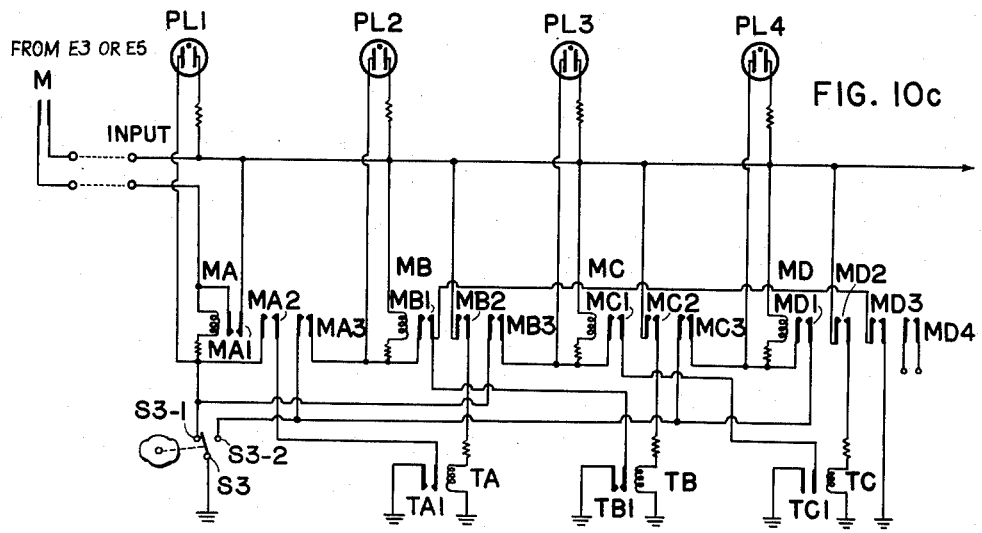
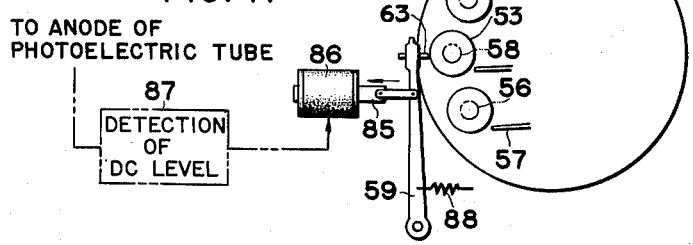

Nov. 16, 1965     TAHIKO HONJYO ETAL     3,217,877
APPARATUS FOR AUTOMATICALLY INSPECTING AMPOULES
Filed Feb. 14, 1963                  5 Sheets-Sheet 5

United States Patent Office 3,217,877
Patented Nov. 16, 1965

3,217,877
APPARATUS FOR AUTOMATICALLY
INSPECTING AMPOULES
Tahiko Honjyo, Mino-shi, Osaka, and Hiroshi Hakata,
Nara, Japan, assignors to Shionogi & Company Limited, Osaka, Japan, a corporation of Japan
Filed Feb. 14, 1963, Ser. No. 258,431
Claims priority, application Japan, Oct. 30, 1958,
33/31,139
6 Claims. (Cl. 209—111.7)

This application is a continuation in part of our copending application, Serial No. 848,985, filed October 27, 1959 and now abandoned.

This invention relates generally to an apparatus for automatically inspecting bottled fluids and more particularly to an apparatus for automatically inspecting a pharmaceutical liquid contained in ampoules for the purpose of detecting or determining whether any foreign matter particles may be contained in the ampoules.

Heretofore, such ampoules containing a pharmaceutical liquid have been inspected by a skilled inspector or inspectors. Accordingly the use of different inspectors results in different individual variation as to what is considered rejectable. In addition, even if one and the same inspector would effect the inspection his criterion of inspection depends greatly upon daily change in his physical and mental health. Since injections from the ampoules are generally given directly into the human body any fluctuation in the inspection results is actually undesirable.

In order to eliminate this drawback there have previously been proposed a variety of automatic ampoule inspection methods and devices using photosensitive means adapted to be energized by light affected by the contents of ampoules. It is known that, in order to improve the ability to detect foreign matter which may be contained in the contents, the same is rotated with respect to the ampoule maintained stationary and thereby only light scattered by and reflected from the foreign matter is utilized.

However, due to the fact that such foreign matter is very minute and usually has an average diameter of the order of 10 microns the known inspection methods and devices as above described have encountered various difficulties. For example, if a current output from a photocell used will have a high magnitude of direct current component then a ratio of signal to noise and hence the ability to detect foreign matter is reduced due to the concomitant noise in the photocell. An increase in a flow of photoelectric current through the photocell may drive the latter to its saturation to cause the inspection device to lose its performance of detecting minute foreign matter. On the other hand, where only a varying current component, included in the photoelectric current, is utilized to detect the foreign matter such a varying current component may include, in addition to a current component resulting from light scattered by and reflected from the foreign matter, another current component resulting from any oscillation of the free surface of the content of an ampoule and from mechanical vibrations of the ampoule as well as from minute bubbles formed in the same. Further, the operating characteristics of the photocell used and the associated electronic components may vary in operation. It is highly desirable to eliminate the malfunction of an ampoule inspecting apparatus caused by the phenomena just described.

The principal object of the invention is accordingly to provide an improved apparatus for automatically inspecting the contents of ampoules with both a high degree of accuracy and a high efficiency wherein photosensitive means are adapted to receive light scattered by and reflected from foreign matters which may be contained in the contents.

Another object of the invention is to provide an improved automatic ampoule inspection apparatus as described in the principal object wherein means are provided for minimizing the effect of stains on the outer wall surface of an ampoule and structural defects of the ampoule such as minute bubbles formed in the ampoule wall during its manufacture.

Another object of the invention is to provide an improved automatic ampoule inspection apparatus as described in the principal object wherein means are provided for automatically compensating for any variation in the operating characteristics of photosensitive means and the associated electronic components which may occur in operation, at predetermined intervals of time.

An additional object of the invention is to provide in an apparatus for automatically inspecting the contents of ampoules improved means for firmly holding an ampoule in simple manner and facilitating loading and unloading of the ampoule as well as initiation and abrupt termination of rotation of the loaded ampoule.

These and other objects of the invention will become more readily apparent upon the consideration of the following detailed description of a preferred embodiment thereof illustrated by way of example in the accompanying drawings in which:

FIG. 1 is a schematic plan view of an automatic ampoule inspection apparatus constructed in accordance with the teachings of the invention;

FIG. 2 is an elevational view, partly in vertical section of the apparatus illustrated in FIG. 1 with the section taken along the line II—II of FIG. 1;

FIG. 5a is an elevational view, partly in section of an ampoule holder device used in the apparatus illustrated in FIG. 1;

FIG. 5b is a top view of the device illustrated in FIG. 5a;

FIG. 6 is a diagrammatic plan view of a light-beam producing device with a part broken away;

FIG. 7 is a schematic view of positions of an ampoule to be inspected and a photosensitve device relative to the light-beam producing device illustrated in FIG. 6;

FIGS. 8a and 8b show diagrammatic views of a shield device for eliminating the effect of the liquid surface in an ampoule upon inspection;

Figure 10A:
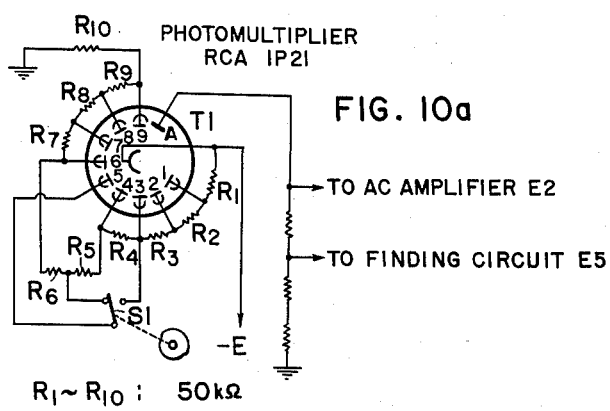
Figure 12:
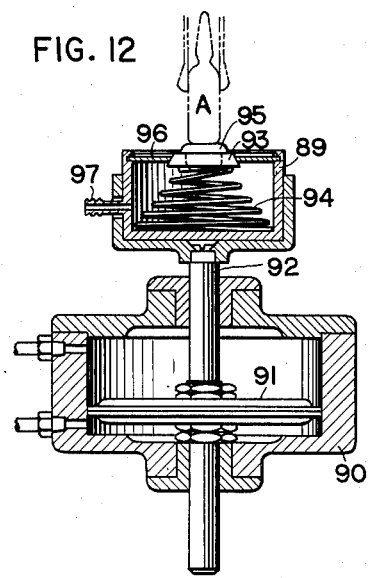
Figure 14:
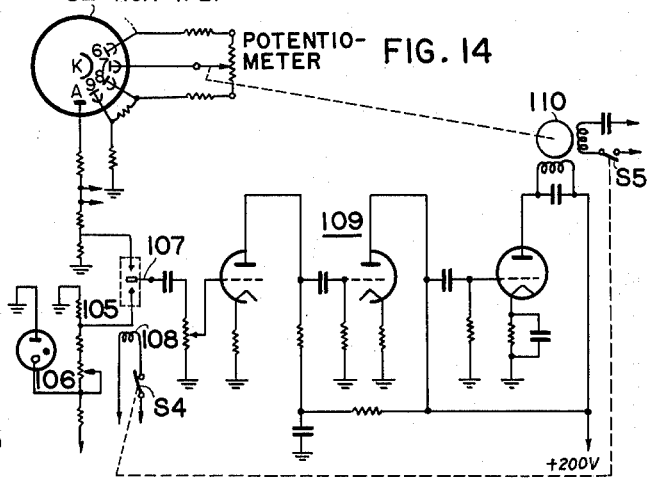
Figure 13A:
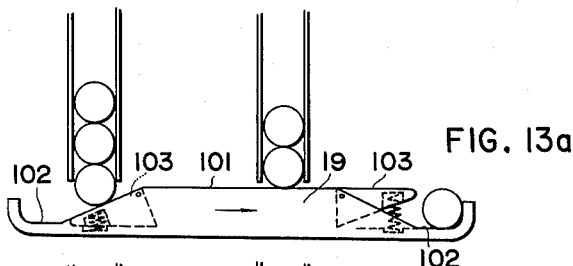
Figure 13B:
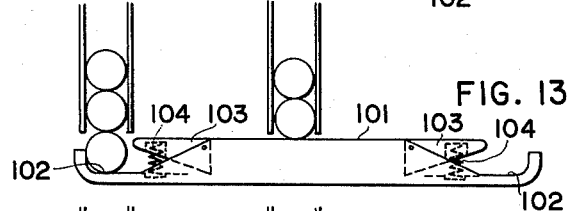
Figure 13C:
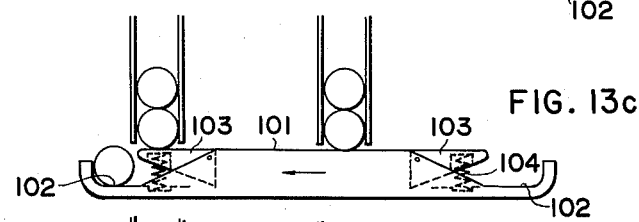
Figure 13D:
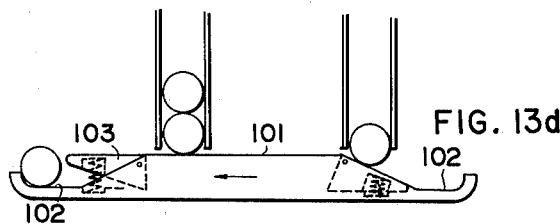

FIGS. 10a, 10b, and 10c are schematics of electric circuits used in the ampoule inspecting unit;

FIG. 11 is a diagrammatic view of a device for stopping rotational movement of the ampoule holder device illustrated in FIG. 6;

FIG. 12 is a diagrammatic view of an elevational view, partly in section of an ampoule wetting device;

FIGS. 13a–13b are schematics of means for minimizing shock to which an ampoule is subjected; and FIG. 14 is a diagram of a circuit for automatically maintaining the sensitivity of the photosensitive device substantially constant.

According to the invention ampoules to be inspected are fed into an inspecting station one after another and each ampoule is preliminarily brought into rotational movement about its longitudinal axis before it reaches the inspecting station. In the inspecting station the rotation of the ampoule is abruptly terminated thereby permitting the content of the ampoule to continue to rotate, for a short time, due to its inertia and then the contents are irradiated by a parallel beam of a light in the form of a thin flat beam. If minute foreign matter particles are included in the contents of the ampoule, a portion of the parallel beam of light is scattered by and reflected from the foreign matter particles rotated with respect to the stationary ampoule. The scattered and reflected light whose intensity is now varied with time is picked up by a photosensitive device disposed in a suitable position out of the direction of the parallel beam leaving the ampoule and converted into an electric current including a current component having a time-varying intensity or an alternating current component and another current component having its intensity not varying with time or a direct current component. Then the alternating current is extracted to be utilized for detection of the minute foreign matter particles in the contents of the ampoule and the direct current component also is extracted to be utilized for finding non-inspectable ampoules for a purpose described hereinafter. After having been inspected each of the ampoules is displaced to a sorting station wherein, in accordance with the magnitudes of the alternating current component and the direct current component from the photosensitive device it is sorted in any one of three grades, namely accepted or standard ampoules, rejected or defective ampoules and non-inspectable ampoules or ampoules required to be again inspected.

Briefly, an automatic ampoule inspection apparatus according to the invention is generally composed of an ampoule introducting unit, an ampoule transferring unit, an ampoule loading unit, an ampoule inspecting unit, an ampoule unloading unit and an ampoule sorting unit as well as of an electric circuity associated with the ampoule inspecting and sorting units and a drive. The entire of the apparatus is enclosed with an optically shielding housing in order to prevent the same from being affected by external light.

Referring now to FIGS. 1 and 2 of the drawings, there is illustrated an automatic ampoule inspection apparatus constructed according to the teachings of the invention with the optically shielding housing as above described being omitted for the purpose of clarity. An electric motor 1 equipped with a reduction gear (not shown) is rigidly secured to a machine base B and is adapted to drive through bevel gears 2 to 9 a grooved cam 10 mounted on a driving shaft 10s horizontally supported on the base B through any suitable means. A turntable 11 is rigidly secured on a vertical shaft 11s rotatably carried on the base B, at a level slightly lower than that of the grooved cam 10 and includes a plurality of pins 12 disposed at substantially angularly equal intervals in a circular array at positions where they can engage the grooves of the grooved cam 10. As clearly shown in FIG. 2 the turntable 11 has its peripheral portion lower than its central flat portion and is provided with a plurality of ampoule holder devices 13, which will be described in detail hereinafter, disposed at substantially angularly equal intervals in a circular array. In the illustrated embodiment of the invention it is assumed that the number of the ampoule holder devices is thirty-two although a larger or smaller number of the holder devices may be used if desired. The grooved cam 10, the pins 12 and the ampoule holder devices 13 are designed and arranged such that, when the motor 1 is energized the turntable 11 is intermittently rotated in the direction of the arrow showing in FIG. 1 through successive angular rotations each angle corresponding to the central angular distance between any pair of adjacent ampoule holder devices. Therefore, the cam 10 and the pins 12 form indexing means for the present apparatus.

A bevel gear 14 is shown on the lower and left-hand portion of FIG. 1 as being driven by the bevel gear 2 and meshing a bevel gear 15 which, in turn, serves to drive a horizontal control shaft 16 on which various cams as will be described later are mounted in order to control the sequence of operation of the present apparatus.

FIG. 1 shows a pair of turntables 11 juxtaposed for the purpose of increasing efficiency of inspection. These turntables, however, are identical with each other in construction and associated with the various units previously set forth and also identical with each other except for the ampoule introducing unit common to them. Therefore, the lower turntable 11 and the associated components will be described.

The ampoule introducing unit is disposed substantially midway between the pair of turntables 11 on the lefthand side thereof as viewed in FIG. 1 and comprises a pair of ampoule conveying chutes 17 juxtaposed in parallel relationship and vertically tilted, a movable endless belt 18 providing a common bottom surface for the chutes 17, and an ampoule distributor device 19 disposed adjacent the lower ends of both chutes.

In operation, ampoules to be inspected can be succesively fed into the pair of conveying chutes 17 through a hopper forming the common upper end of the chutes and descend within the chutes 17 by the action of gravity and by moving belt 18 until the lowermost ampoule in each chute rests in one of two recesses formed on the distributor device 19 at both ends with other ampoules stacked on one another. The rotation of the control shaft 16 effects the rotation of a grooved cam 20 mounted thereon to move bilaterally the ampoule distributor device 19 to alternately transfer the ampoules from the distributor device 19 onto a pair of ampoule transferring member 21 disposed adjacent both sides of the device 19 and forming a part of the ampoule transferring unit which will be subsequently described.

Figure 3:
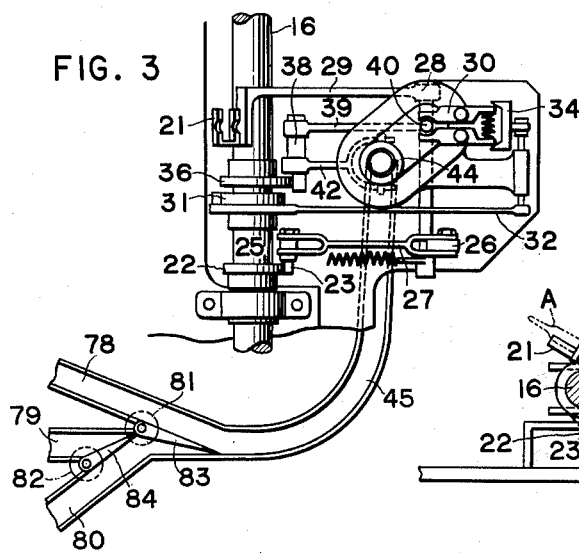
FIG. 3 is a plan view of an ampoule transferring unit, an ampoule loading unit and an ampoule sorting unit used in the apparatus illustrated in FIG. 1.
Figure 4:
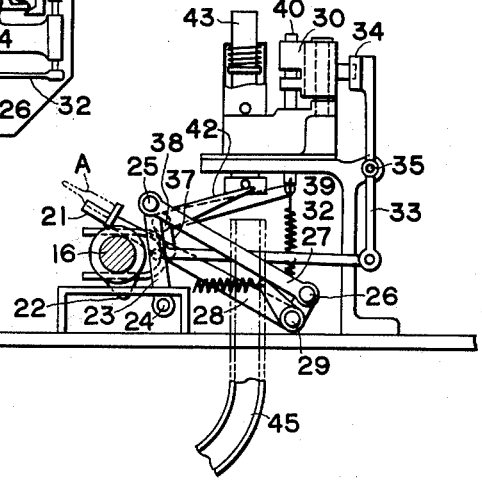
FIG. 4 is a front view of the units illustrated in FIG. 3.

As shown in FIGS. 3 and 4, the ampoule transferring unit comprises a cam 22 mounted on the control shaft 16 and a cam follower or lever 23 controlled by the cam 22. The lever 23 has its one end 24 suitably pivoted to a machine frame (not shown) and the other end at which one end 25 of a connecting rod 27 pivotably secured. Pivotably mounted at the other end 26 of the connecting rod 27 is one arm end of a bell crank 28 having the other arm end having rigidly secured thereto the transferring member 21 as previously explained. The bell crank 28 is arranged to swivel about its fulcrum 29 within certain limits as will be apparent later.

In operation the cam 22 is driven to rotate the cam follower 23 about the pivot 24 in the clockwise direction as viewed in FIG. 4. This movement of the cam follower is transmitted through the connecting rod 27 to the bell crank 28. Thus the bell crank 28 is rotated about its fulcrum 29 in a clockwise direction as viewed in FIG. 4 until the longer arm of the same is brought into its vertical position where the bell crank is ready for transferring an ampoule designated by dotted line A in FIG. 4 and carried by the transferring member 21 onto the ampoule loading unit.

FIGS. 3 and 4 also show the ampoule loading unit. This unit comprises an ampoule grasper 30 disposed just above the longer arm of the bell crank 28 as displaced into its vertical position and adapted to receive the ampoule carried by the ampoule transferring member 21. The unit also includes a cam 31 mounted on the control shaft 16, a cam follower or lever 32 controls the cam 31, a connecting lever 33 operatively connected to the cam follower 32 and an operating pawl 34 coupled to the lever 33. The cam 31 serves to swivel the pawl 34 about a shaft 35 for the lever 33 on the plane of FIG. 4 to thereby open and close the grasping jaws 30. The cam 31 is designed and arranged such that the grasping jaws 30 are opened only when any ampoule carried by the transferring member 21 has been transferred into the position just below the jaws. This ensures that the grasper 30 grasps smoothly the ampoule between its jaws.

The loading unit further includes a cam 36 mounted on the control shaft 16, a cam follower or lever 37 controlled by the cam 36, a shaft 38 coupled to the cam follower 37, an actuating rod 39 operatively connected to the shaft 38 and a push rod 40 adapted to be actuated by the rod 39 to urge the ampoule grasped between the grasping jaws 30, upwardly The cam 36 serves to move the actuating rod 39 to the right as viewed in FIG. 4 to thereby move upwardly the push rod 40 to load the ampoule grasped between the grasping jaws 30 into one of the ampoule holder devices 13 which has come to the loading station 41 (see FIG. 1) located immediately above the push rod 40.

The ampoule unloading unit comprises a lever 42 operatively coupled to the shaft 38 and an ampoule unloading member 43 adapted to be moved upwardly by the lever 42 to unload the ampoule held by the holder device 13 which has brought in the unloading station 44 adjacent the loading station 41. The unloaded ampoule is fed through a trough 45 into the ampoule sorting unit where the ampoule will be suitably sorted in a manner as will be described hereinafter.

Referring now to FIG. 5, there is illustrated in detail a preferred form of the ampoule holder device as previously explained. The ampoule holder device 13 comprises a spindle chuck 46 including tongs or expandable jaws i.e. intended to be expanded when an ampoule in inserted from the lower end thereof and having a tapered or flared outer face, an annular spring seat 47 slidably abutting against the flared outer face of the expandable jaws, and a spring 48 disposed between the seat 47 and a shoulder 49 formed at the other end of the chuck and encircling the jaws. The spring 48 serves to urge the annular spring seat 47 downwardly and has a tendency to press the jaws inwardly to hold the inserted ampoule firmly. Thus it will be appreciated that upward movement of the push rod 40 as previously described causes an ampoule grasped by the grasper 30 to be readily inserted between the jaws 46 against the action of the spring 48. Also the upward movement of the unloading member 43 effects upward movement of the spring seat 47 permitting the ampoule to drop into the trough 45.

The holder device 13 further includes a rotatable shaft 50 rigidly connected to the upper end of the chuck 46 and supported by a flanged sleeve 51 through a pair of bearings 52 disposed at the upper and lower ends thereof. The rotatable shaft 50 is provided at its free or upper end with a windmill 53 which may, for example, comprise a plurality of vanes 54 in the form of a semi-spherical cup secured at substantially equally angular intervals in circular array to a circular disk 55 with the concave surfaces of the cups disposed in the same sense. As shown in FIG. 5a, the holder device 13 is rigidly secured to the turntable 11 by having the flanged portion of the sleeve 51 mounted to the turntable 11 as by bolts and nuts.

From the foregoing it will be appreciated that, as the turntable 11 is intermittently rotated by the motor 1 through the bevel gears 2 to 9 and the indexing means 10, 12, the ampoules fed into one of the conveying chutes 17 are firmly held in the associated holder device 13 delivered to the loading station 41 one after another in the manner above described and subsequently reach the preparatory station 56 (see FIG. 1) after they have travelled through an angular distance nearly corresponding to one complete rotation of the turntable 11. As shown in FIGS. 1 and 11, the preparatory station 56 is provided with an air nozzle 57 for directing a jet of air under pressure to the windmill 53 of the holder device 13 which has just reached this station. This causes the ampoule to be rotated about its longitudinal axis at a high rate. Then the rotating ampoule together with its holder device 13 is stepped to the inspection station 58 (see FIG. 1) after the turntable 11 has been rotated by one step.

As shown in FIG. 1, the inspecting station 58 is provided with a brake rod 59 operatively coupled to a cam 60 mounted on the control shaft 16 and includes a light-beam producing device generally designated by the reference numeral 61 and a photosensitive device 62 which form a part of the ampoule inspecting unit as will be more fully described hereinafter. The brake rod 59 is provided adjacent its free end with brake shoe 63 (see FIGS. 5 and 6). When the cam 60 actuates the brake rod 59 the shoe 63 engages the periphery of the disk 55 of the holder device 13 brought into the inspecting station 58 to thereby stop abruptly rotational movement of the same and hence the ampoule held by the device 13. This permits the contents of the ampoule to remain rotating relatively to the stationary ampoule for a short time due to inertia. While the contents of the ampoule are still being rotated the same are irradiated by a parallel beam of light from the light-beam producing device 61. If minute foreign matter particles are included in the content at least one portion of the beam is scattered by and reflected from the same. Then the scattered and reflected light is picked up by the photosensitive device 62 disposed opposed to the device 61 but in a direction deflected from the optical axis of the same by a predetermined angle.

The ampoule with its holder device 13 is then displaced from the inspecting station 58 to the unloading station 44 where the ampoule disengages from its holder device in the manner as previously described.

As previously pointed out, the principle of the invention is to detect minute foreign matter particles included in the contents of an ampoule as a function of an alternating current component separated from a direct current component caused by the wall of the ampoule. If the magnitude of this direct current component is high, an output current from a photosensitive device such as 62 will be increased in noise level resulting in a decrease in a ratio of signal to noise due to its shot noise. In addition, such direct current may hide the alternating current component thereby reducing the ability of detecting very minute foreign matter particles. Also an increase in the direct current component may lead to a fear of substantially losing the ability to detect any foreign matter because of the saturation of the photosensitive device used. For these reasons, it is very essential to reduce the level of direct current in the output from the photosensitive device to the minimum value. In other words, it is preferred that light scattered by and reflected from minute foreign matter particles is effectively utilized while light scattered by the material of the ampoule is maintained at a minimum. To this end, the invention contemplates to irradiate any ampoule by a well-defined beam of light in the form of a thin flat pencil or a rectangular shape having it longer side considerably larger than its shorter side.

FIG. 6 shows one form of a light-beam producing device constructed according to the teachings of the invention. A light-beam producing device generally designated by reference numeral 61 includes an elongated housing 64 having an end open and the other end closed, a light emitting source such as an incandescent lamp 65 disposed on the closed end portion of the housing 53, a collimator lens 66 disposed in front of the lamp for converting light emitted by the lamp into a parallel beam of light, and a plurality of vertically elongated, aligned slits 67 of the same shape disposed between the collimator lens 66 and the open end of the housing 64. As shown in FIG. 6, the vertically elongated slits 67 may be preferably formed in aligned relationship on the central portions of a plurality of parallel partitions for dividing the space between the collimator lens 66 and the open end of the housing 64 into a plurality of compartments. With the arrangement illustrated, the parallel beam of light coming out from the collimator lens 66 passes through the slits 67 and leaves the housing 64 through its open end as a narrow parallel beam of light in the form of a thin flat beam of rectangular profile well defined by the slits 67. This narrow parallel beam of light is adapted to be incident upon any ampoule held by the holder device brought into the inspecting station and the substantial portion of the beam is passed through the longitudinal axis of the ampoule. It is necessary to make the width of the beam sufficiently narrow to prevent the beam from being scattered by and reflected from the substantial portion of the ampoule wall for the purpose of minimizing the magnitude of the direct current component in the output current from a photosensitive device such as 62. It has been found that a narrow parallel beam of light having its width of approximately 1 mm. is satisfactorily used to obtain the best results.

The light beam device 61 further includes a duct 68 attached on one side of the housing 64 over the substantial length and having near the open end of the housing one open end deflected toward the same and the other end communicating with the lamp compartment through electromagnetic shutter means and a hole 69 formed on the side wall of that compartment for a purpose which will be apparent hereinafter. The electromagnetic shutter means include a hollow cylindrical member of non-magnetic material 70 provided on the lower end portion with a pair of small apertures 71 disposed diametrically, an electrical winding 72 wound on the hollow cylindrical member 70 and a cylindrical rod of magnetic material 73 movably disposed within the hollow cylindrical member 70 and serving to close normally the small apertures 71. Disposed in the duct 68 is a light-transmitting rod 74 of any suitable material such as glass having one end facing the apertures 71 and the other end 75 facing an ampoule brought into the inspecting station and hence the photosensitive device 62 (see FIG. 7). It will be appreciated that, with the winding 72 energized, the magnetic rod 73 is moved upwardly within the hollow member 70 to open the apertures 71 whereby a portion of light emitted from the lamp 65 is permitted to be passed from the hole 69 and the opened apertures 71 through the interior of the rod by virtue of its total reflection until the same will appear on the other end face 75.

Returning back to FIG. 1 the light scattered by and reflected from the ampoule is picked up by the photosensitive device 62. It has been found that the photosensitive device 62 is preferably disposed behind an ampoule being inspected and in a direction angularly displaced from the direction of the incident beam by an angle $\theta$ of from 20° to 30° in order to detect minute foreign particles in the content of the ampoules with the maximum sensitivity (see FIG. 7). It has been also found that when the photosensitive device is disposed in such a position a ratio of signal to noise of the output from the same has been very high with the result that the detection can be performed with a high degree of accuracy. If the angle $\theta$ is selected to exceed 30° a great decrease in both the sensitivity and the ratio of signal to noise results. It is to be understood that the photosensitive device may be disposed on the side of the direction of light beam opposite to that illustrated in FIG. 7.

Figure 9:
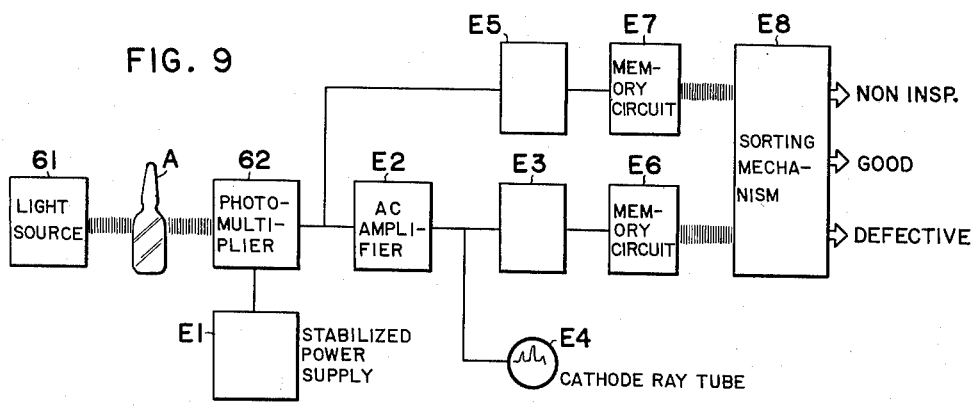
FIG. 9 is a block diagram of an ampoule inspecting unit.

Referring now to FIG. 9 of the drawings, there is illustrated electronic circuitry suitable for use with the inspecting unit, the unloading and sorting unit. As shown in FIG. 9 the aforesaid narrow parallel beam of light originating from the light-beam producing device 61 falls upon an ampoule A to be inspected and is scattered and reflected by the same. The scattered and reflected light is picked up by the photosensitive device 62 adapted to be energized by a stabilized source E1 of electric voltage and converted into an electric current which may include a direct current component due to the stationary ampoule and a pulse component due to foreign materials contained in the rotated content of the ampoule as previously described. The output of the photosensitive device 62 is connected to a suitable pulse amplifier E2 where the pulse component is suitably amplified. The output of the amplifier E2 is applied to a circuit E3 for discriminating between acceptable and rejectable or defective ampoules and also to a cathode ray tube E4 through which the output of the amplifier E2 can be visually observed. The discriminating circuit E3 functions to discriminate between acceptable and defective ampoules in such a manner that any ampoule providing a pulse output of the amplifier E2 not exceeding a predetermined level is acceptable while one providing the output current exceeding the predetermined level is rejectable or defective.

The output of the photosensitive device 62 also is connected to a circuit E5 for finding non-inspectable ampoules where any ampoule providing a direct current output from the photosensitive device 62 exceeding a predetermined level is not inspectable. The term "non-inspectable" means that due to a low ratio of signal to noise and/or a high direct current component there may be a danger that the discrimination between the acceptable and defective ampoules as above described will be erroneously effected. Therefore, any ampoule found non-inspectable should be again inspected regardless of the output from the discriminating circuit.

The outputs of the discriminating and finding circuits E3 and E5 respectively are connected to memory circuit E6 and E7 respectively where output signals from the circuits E3 and E5 are stored until the inspected ampoule is displaced to the unloading station 44 (see FIG. 1). Upon unloading the inspected ampoule from its associated holder device 13, an ampoule sorting mechanism E8 is actuated by the signals stored in the memory circuits E6 and E7 to sort the ampoule into any of "Acceptable," "Defective" and "Non-inspectable" ampoules in accordance with the signals stored in the memory circuits E6 and E7.

As shown in FIG. 10a, the photosensitive device 62 may comprise a photoelectric tube T1 such as a type 1P21 photomultiplier including a photocathode K, an anode An and a plurality of dynodes D1, D2, . . . . The photocathode K and the dynodes D1, D2, . . . are supplied with suitable operating voltages by a voltage divider network including a plurality of resistors R1, R2 . . . , serially connected across the output terminals of the stabilized source of direct current voltage which may be of conventional type and have, for example, its voltage variation of less than ±0.1% for a source voltage variation of ±10%.

It is to be noted that any suitable dynode, in this case the dynode D5 is normally connected to a point on the voltage divider network through a cam-operated switch S1. This switch is adapted to be transferred by a cam illustrated adjacent the same to change a voltage at that dynodes so as to reduce the output from the photoelectric tube to a negligible magnitude for the purpose that at the moment an ampoule crosses the irradiating beam of light during displacement of the same to the inspecting station the photoelectric tube is prevented from providing an appreciable output due to a portion of the beam strongly scattered and reflected by the wall of the ampoule. This ensures the occurrence of high transient signals in the succeeding circuits, E2 and E5.

The pulse amplifier E2 may be of any conventional type. However, the amplifier may be preferably provided with a cam-operated switch (not shown) connected in the grid circuit of the first stage thereof to ground the grid circuit during all period of time other than the inspecting period to thereby decrease the effect of transient signals due to the operation of the cam-operated switch S1 associated with the photoelectric tube T1 to an extent as low as possible. It has been found that the amplifier has a maximum gain of approximately 60 dbs at a frequency of 20 cycles per second with a satisfactory result.

FIG. 10b shows one form of the circuit E3 for discriminating between acceptable and defective ampoules. The circuit illustrated includes a well-known Schmitt circuit comprising, for example, a type 12AU7 twin-triode T2 and a thyratron tube T3 connected to the same. The tube T3 includes in its output circuit a coil of a relay DR having its make contacts DR1 and a cam-operated switch S2 serially connected to the same. As well known in the art, a Schmitt circuit provides an output pulse of constant amplitude only as long as a voltage applied to its input exceeds a predetermined value. If the output from the amplifier E2 resulting from the presence of the foreign matter particles in the content of the ampoules being inspected will have its maximum peak exceeding a predetermined level the Schmitt circuit will produce an output pulse to fire the tube T3 energizing the relay DR. The relay closes its make contacts DR1 adapted to be connected to the input of the memory circuit. On the contrary, if the maximum peak of the output from the amplifier will not exceed the predetermined level the tube T3 and hence the relay will remain inoperative. Thus an acceptable ampoule can be discriminated from defective one. Due to its characteristic the fired tube T3 is maintained energized until the voltage at its anode electrode is interrupted. Therefore, the cam-operated switch S2 is maintained closed as long as the cam-operated switch which is associated with the amplifier E2 is being opened. The predetermined level as above described can be varied over a wide range by controlling or setting a potentiometer VR provided in the input to the Schmitt circuit.

The circuit E5 for finding non-inspectable ampoules may be identical with the discriminating circuit as shown in FIG. 10b except that the Schmitt circuit of finding circuit E5 includes an input network stage whose output comprises an anode resistor and a capacitor parallel to the same. The capacitor serves to integrate the output from the photoelectric tube T1 permitting a substantially smooth signal to be applied to the Schmitt circuit. Therefore, the direct current level of the output from the photoelectric tube T1 provides a measure of finding non-inspectable ampoule. The other portions of the finding circuit may be identical with the discriminating circuit in construction and operation.

As the memory circuit previously described, a circuit arrangement illustrated in FIG. 10c may be effectively used. The arrangement illustrated includes a plurality of memory relays in this case four memory relays MA, MB, MC and MD, and a plurality of transfer relays in this case three transfer memory relays TA, TB and TC interconnected in a manner illustrated in FIG. 10c. The make contacts such as DR1 (see FIG. 10b) in the discriminating or finding circuit as previously described are connected to energize the first memory relay MA from a suitable source of direct current through a cam-operated switch S3 including a contact arm adapted to effect two reciprocal movements between its stationary contacts S3–1 and S3–2 by the associated cam during one complete rotation of the same.

With the contact arm engaging the stationary contact S3–1 of the switch, the closure of the make contacts in the preceding circuit E5 or E6 effects energization of the first memory relay MA. Thus relay closes its make contacts MA1 parallel to the make contacts in the preceding circuit and also closes its make contacts MA2 to complete a holding circuit for the relay through break contacts TA1 of the first transfer relay TA. In these circumstances the contact arm is moved away from the stationary contact S3–1 and engages the stationary contact S3–2 permitting the second memory relay MB to be energized through the now closed make contacts MA3. This relay is self-held through its make contacts MB1 and break contacts TB1 of the second transfer relay TB. At the same time the first transfer relay TA, however, is energized through the make contacts MB2 and, in turn, opens the brake contacts TA1 resulting in deenergization of the first memory relay MA. Thus the energization state is transferred from the first memory relay MA to the second memory relay MB. The subsequent transfer of the contact arm of the switch S3 from the stationary contacts S3–2 to the stationary contacts S3–1 will transfer the energization state from the second memory relay MB to the third memory relay MC in the same manner as just described. When the contact arm engages again the stationary contacts S3–2 the energization state is similarly transferred from the third memory relay MC to the fourth memory relay MD. The memory relay MD includes, in addition to its contacts MD1, MD2 and MD3, its make contacts MD4 adapted to energize a sorting solenoid as will be described hereinafter. When the contact arm returns back to its original position at which it engages the contacts S3–1 and if it is assumed that the output from the preceding circuit E3 or E5 disappears by the action of the associated cam the memory circuit will return back to its original state and be ready for the subsequent operation.

It will be appreciated that if the preceding circuit E3 or E5 will produce no output that none of the memory relays is energized.

If desired, indicator lamps PL1, 2, 3 and 4 may be connected in series to the coils of the memory relays MA, MB, MC and MD respectively in order to indicate visually the memory operation as above described.

From the foregoing, it will be seen that the memory circuit stores the output state of the preceding circuit E3 or E5 during one complete rotation of the cam associated with the switch S3.

The various cams of cam-operated switches used in the electronic circuitry as previously described may comprise micro switches 76 and cams 77 mounted on the control shaft 16 as shown in FIG. 1.

Returning back to FIG. 3, the trough 45 communicates with three sorting ducts 78, 79 and 80 of the sorting unit provided for receiving noninspectable, acceptable and defective ampoules respectively. Disposed adjacent the beginning ends of these sorting ducts are a pair of sorting solenoids 81 and 82 adapted to be energized by the memory circuits asociated with the finding circuit E5 and the discriminating circuit E3 as previously described. Upon energization, the solenoids 81 and 82 actuate the associated flaps 83 and 84 shown in their actuated positions in FIG. 3. The flap 83 as actuated permits the inspected ampoule to be passed through the sorting duct 78 for noninspectable ampoules whereas the flap 83 as actuated permits the inspected ampoule to be passed through the duct 80 as a defective ampoule. Therefore, any acceptable ampoule can be passed through the sorting duct 79 only when none of the sorting solenoids has been energized.

As previously described, the output state of the discriminating or finding circuit E3 or D5 or the result of inspection is stored in the memory circuit E6 or E7 as the case may be during one complete rotation of the associated cam. Within the same period of time an inspected ampoule is displaced to the unloading station where it is ready for removal from the associated holder device 13. Therefore, it is to be noted that closing of the make contacts MD4 of the memory relay MD should be effected at the instant the cam 36 associated with the unloading station is actuated to drop the inspected ampoule into the trough 45. Thus the inspected ampoule can be properly sorted in accordance with its result of inspection.

As previously described, the pulse component of the output from the photosensitive device is utilized to discriminate between the ampoules accepted and rejected. However, the direct current component of said output due to the scattered and selected light from the ampoule wall may have a relatively high level. Alternatively, the ratio of signal to noise and/or the saturation of the photosensitive device may be called in question. These will take place when defects of the ampoule per se are located in the passage of light or on one or both of those portions of the ampoule which the light falls upon and leaves. Such defects of the ampoule may involve stains and faults on the outer wall surface of the ampoule and filamentous bubbles within the wall of the ampoule formed by elongation of bubbles in molten glass into lines when the ampoules are made. It is to be noted that such defects of the ampoule have a relatively significant effect upon the scattered and reflected light leaving the ampoule even though they may be minute.

The invention contemplates means to compensate for any abnormal change in the direct current level of the output from the photoelectric tube T1 due to the above-mentioned defects of an ampoule by the provision of a mechanism for correcting the state of the ampoule in which the same has come to a standstill in the inspecting station 58 (see FIG. 1). The mechanism is adapted to slightly turn the ampoule about its vertical axis in the inspecting station prior to detecting operation, and provided that the direct current level would be abnormally changed. The slight turning of the ampoule is effective for deviating the defects of the ampoule from the passage of light. The correcting mechanism will now be described in conjunction with FIG. 11.

As shown in FIG. 1 and FIG. 11, the inspecting station 58 is provided with a air nozzle 85 through which air under pressure is normally blown into the inspecting station as does the air nozzle 54 in the preparatory station 56. The correcting mechanism includes a plunger 85 operatively connected to the brake rod 59 and a solenoid 86 controllable by the photoelectric tube T1 for actuating the plunger 85. As soon as an ampoule to be inspected has reached the inspecting station the output of the tube T1 is determined as a direct current level. To this end, a circuit 87 for determining the direct current level is connected between the output of the tube T1 and the solenoid 86 (see FIG. 11). The circuit may be similar to the circuit E5 for finding non-inspectable ampoules as previously described excepting that an output of an input stage to a Schmitt circuit has no capacitor because of its rapid response. When a cam-operated switch (not shown) similar to the cam-operated switch S2 as previously described for FIG. 10b is closed and if the output from the tube T1 will have a direct current level exceeding a level predetermined for the aforesaid circuit 87 then the solenoid 86 is energized to actuate the plunger 85 to thereby release the brake rod 59 from the windmill 53 of the holder device 13 (see FIG. 5) against the action of a spring 88. Thus air under pressure from the air nozzle 84 can rotate the ampoule held by the holder device. Shortly before the ampoule is inspected, the cam-operated switch is opened to deenergize the solenoid whereupon the ampoule is again stopped and then inspected.

As above described, the ampoule is corrected in position within an interval of time of from the initial stopping of ampoule rotation to the commencement of ampoule inspection. Therefore, it will be appreciated that an ampoule corrected in its position is inspected for a predetermined period the same as a period for which an uncorrected ampoule is inspected. It is noted that as an ampoule is corrected in position only once; the corrected ampoule is not recorrected in position even if such an ampoule produces any abnormal change in the direct current level of the output from the photoelectric tube. Further it is to be understood that a pressure of air blown through the air nozzle 84 is chosen to be relatively low in order to prevent the ampoule being inspected from effecting any tremor due to air supplied by the nozzle 84 and against the action of the frictional force between the windmill 53 of the holder device 13 and the brake shoe 63 of the brake rod 59.

While the various defects of the ampoule wall such as previously described never diminish the value of an injection contained in the ampoule it is desirable to temporarily decrease an intensity of light scattered by such defects. To this end, means for increasing the light permeability of an ampoule by effectively wetting the same with any suitable liquid may be provided in any desired position suitably preceding the inspecting station, for example, at a wetting station 89 preceding the inspection station 58 by several steps as shown in FIG. 1. Alcohol or an aqueous solution containing a very low concentration of any suitable surface-active agent may be used for the purpose of wetting the ampoule wall. It will be understood that wetting of the ampoule wall with such a liquid will reduce the index of refraction of stain particles on the wall glass because such particles are not only covered with the layer of the liquid having an index of refraction approximating that of the glass wall but also minute irregularities on the ampoule wall due to minute stain particles, external damages etc. on the wall surface are eliminated to provide a substantially smooth surface of the ampoule wall. It has been found the wetting process as above described has substantially the same result as if an ampoule is carefully wiped with a cloth and an excellent result as to externally damaged ampoules which could not be obtained by wiping. It is, however, to be noted that the wetting process aims at temporary elimination of the optical effect of stains, external damages on the ampoule wall but not at washing-away of stains.

FIG. 12 shows one form of the wetting device as above described. The wetting device illustrated comprises a pot 89 for containing therein a suitable liquid with which an ampoule A is wetted and a hydraulic cylinder 90 including a piston 91 slidable in the same and a piston rod 92 connected to the piston 91 and having one end rigidly connected to the bottom of the pot 89. The pot 89 includes also a plastic cup 93 held centrally in the same by a helical spring 93. A gun board 95 is disposed upon the cup 89. With the arrangement illustrated, it will be seen that when an ampoule has reached a position above the pot 89 in the wetting station 88 (see FIG. 1) the hydraulic cylinder means 90–91 are operated by a cam (not shown) mounted on the control shaft 16 (see FIG. 1) to temporarily raise the pot 89 to wet the wall of the ampoule A with the liquid in the pot. The gun board 95 serves to contact the bottom of the wetted ampoule to drain liquid drops collected on the same. Also an annular plate 96 is fixed to the upper portion of the pot 89 at such a level that the draining board and the cup do not interfere with the movement of the ampoule in the wetting station. The annular plate 96 also serves to maintain the cup 93 and the draining board 95 centrally in the pot. In order to maintain the level of the liquid in the pot substantially constant the side wall of the pot 89 may be connected to a duct 97 connected to a liquid reservoir (not shown).

As previously described, the contents of any ampoule are inspected while still rotating with respect to the ampoule which is in a stationary state. Therefore, the free surface of the contents inevitably oscillates although the amplitude of this oscillation would be very low. In order to eliminate the effect of this oscillation upon inspection the narrow beam of light emitted by the light-beam producing device 61 (FIG. 6) is passed through the ampoule with a clearance or dead zone between the deepest portion of the liquid surface and the upper edge of the passed beam of light. In other words, the free surface of the content should not be irradiated directly with the beam of light. Nevertheless, those portions of light scattered by and reflected from various parts of the ampoule wall irradiated with the beam of light may be incident upon the free surface of the contents. (A great part of the scattered and reflected light is caused by the bottom surface of the ampoule.) This causes the free surface of the contents and in particular the deepest portion thereof to be more or less bright. Since the free surface of the contents oscillates slightly as above pointed out, that portion of light reflected from the oscillating free surface of the contents has an amplitude varying with time resulting in the possibility of erroneously discriminating or inspecting an ampoule.

In order to eliminate this erroneous discrimination, the invention comprises means to provide a light shielding plate between an ampoule being inspected and the photosensitive device such that a ray of light reflected from the free surface of the contents of the ampoule is prevented from falling upon the photosensitive device. As clearly shown in FIG. 8a a suitable focussing lens 98 is disposed between an ampoule A being inspected and the photosensitive device 62 at a position where a longitudinal section of the ampoule taken in a plane passing through the central axis of the same and perpendicular to the plane of the drawing is focussed in a plane 99 lying short before the device 62 by the lens. Further a light shielding plate 100 is provided in the plane 99 with the plate obstructing just an inverted real image for the free surface of the liquid in the ampoule as shown in FIG. 8b. Thus it will be appreciated that the undesirable light reflected from the free surface of the liquid in the ampoule can be prevented from falling upon the photosensitive device 62 while light scattered by and reflected from the portion of the liquid below its free surface is permitted to reach the device 62 without any obstruction.

It is to be noted that the method of the invention can hardly distinguish bubbles which may be formed in the content of an ampoule, from the foreign matter particles which may also be included in the contents. Of course, the presence of such bubbles affects directly the accuracy of inspection. If an ampoule is subject to strong mechanical oscillation or shock during its movement then the bubbles are very apt to the formed in the liquid contained in the same. Further once minute bubbles have been formed deep in the liquid of the ampoule they can not easily rise to the free surface thereof within a relatively short time.

To minimize or substantially eliminate the formation of the bubbles as above described, for example, the cams 22 and 36 (see FIG. 3) associated with the transferring member 21 and the push rod 40 respectively are preferably designed and constructed such that the components 21 and 40 when moved should not impart mechanical oscillation or shock to the associated ampoules. Further the turntable 11 (FIG. 1) is preferably provided with a relative large number of the holder devices 13 and permitted to be moved through a short angular distance for each step of movement whereby any ampoule loaded in the loading station 41 will reach the inspecting station 58 after lapse of a relatively long time within which the bubbles which might have been formed in the contents of the ampoule before its loading may rise to the free surface of the contents.

It will be readily appreciated that the bubbles are most apt to be formed in the contents of an ampoule upon dropping the latter from the chute 17 on the associated distributor device 19 and transferring the dropped ampoule to the associated transferring member 21. According to another feature of the invention, means are provided for reducing shock imparted to the ampoule as dropped and also for ensuring smooth transferring movement of the same which will be subsequently described.

As shown in FIG. 13 the distributor device 19 disposed immediately below the chutes 17 includes a flat middle portion 101, a recess 102 at each end and tilted edges connecting the middle portion to the associated recess. Further the device 19 includes a rockable stop 103 of triangular cross-section pivotably mounted on each side of the middle portion 101 and normally flush with the upper plane of the middle portion by the action of a weak spring 104 disposed therebetween with no gap left between the mating ends of the stopper and the middle portion. Preferably, the longitudinal length of the middle portion is substantially equal to the central distance between both juxtaposed chutes 17. Therefore, in its stationary position the distributor device 19 supports the array of ampoules in each chute through the associated end area of the middle portion 101 and the associated stop 103 providing the extension thereof and by the action of the spring 104.

Under these circumstances, as the distributor device 19 is moved, for example, in the direction of the arrow shown in FIGURE 13a or in the rightward direction by the operation of the cam 20 (see FIG. 1) the array of ampoules in the lefthand chute 17 is suported by the associated stop 103 alone and the latter, in turn, yields to the weight of the ampoule array against the action of the spring until its supporting upper surface is substantially flush with the tilted edges of the device 19 and merged into the bottom of the recess 102. Further rightward movement of the distributor device 19 allows the lowermost ampoule supported by the tilted stopper to slowly descend along the stopper and the tilted edges (see FIG. 13a) until the same reaches the outer end of the recess while the remaining ampoules are held in the chute at their respective positions lowered by a distance equal to the diameter of the ampoule as compared with their initial positions. As shown in FIG. 13b, the ampoule having reached the outer end of the recess is held between the outer protrusion and the stop now returned back to its normal position by the action of the spring 104 and in engagement with the ampoule. Thus the ampoule is ready for transferring the same to the associated transferring member 21 for the next transferring period. Simultaneously, the space formed at the upper end of the chute by descent of the ampoule array can be occupied by a new ampoule fed from the hopper (see FIG. 1). During the movement of the distributor device just described an array of ampoule in the other chute is supported by the middle portion of the device.

When the distributor device transfers its movement from the rightward direction to the leftward direction the array of ampoules in the lefthand chute continues to be supported by the lefthand stop 103 (see FIG. 11c) and then by the middle flat portion 101 while the lowermost ampoule in an array of ampoules in the righthand chute 17 is slowly moved into the outer end of the righthand recess 102 of the distributor device 19 in the same manner as above described for the ampoule held in the lefthand recess 102 (see FIG. 11d). At the end of this movement of the distributor device the last-mentioned ampoule can be transferred to the associated transferring member 21 (see FIG. 1). Now the operation as above described is repeated to alternately transfer the ampoules in both chutes to the associated transferring members one after another.

As previously described, an acceptable ampoule may be erroneously classified as a defective one due to an increase in the ratio of signal to noise in the electronic circuit connected to the photosensitive device, mechanical vibration and shock. On the contrary, a defective ampoule may be erroneously classified or sorted as an acceptable one due to the saturation of the photosensitive device. To eliminate such erroneous inspection the circuit for finding non-inspectable ampoule has been provided and any ampoule providing an output from such a circuit exceeding the predetermined direct level is fed into the duct 78 (see FIG. 3). Such ampoules can be again inspected.

It is apparent that the output from the circuit for finding non-inspectable ampoule depends upon the brightness of the source of light and the sensitivity of the photosensitive device. Even with highly stabilized sources of voltage used to energize the source of light and the photosensitive device, the slow deterioration of the source of light and the deterioration and fatigue of the photosensitive device inevitably occur to affect the brightness of the former and the sensitivity of the latter respectively.

Therefore, in order to maintain the accuracy and standard of inspection substantially constant during long service, it is very desirable to automatically maintain the sensitivity of detection means constant. For this purpose, there are utilized the glass rod 74 and the associated components as previously described in conjunction with FIG. 6, are utilized. It is understood that an intensity of light appearing from the end of the glass rod 74 is directly proportional to the intensity of the narrow beam of light directed to an ampoule to be inspected and that, when the photosensitive device is irradiated by the light appearing from the rod 74, the same produces its output current whose magnitude is proportional to the sensitivity thereof. Thus it will be apparent that, to automatically maintain the sensitivity of detection means constant, it is required only to automatically control the sensitivity of the photosensitive device so as to maintain its output current always constant for a given intensity of light.

In operation, it is desirable to check the output current from the photosensitive device as irradiated by the ray of light appearing from the glass rod 64 at times and preferably at substantially regular intervals of time. To this end, one of the plurality of ampoule holder devices pendent, in a circular array, from the turntable 11 may be omitted. As that position of the circular array provided with no holder device 13 reaches the inspecting station 58 (see FIG. 1) during its intermittently rotational movement, the electromagnetic shutter means as previously described in conjunction with FIG. 8a is actuated by a cam (not shown) mounted on the control shaft 16 to permit a portion of light emitted by the light-beam device 61 to fall upon the photosensitive device 62 through the now opened shutter 70–73, the glass rod 74 and the lens 98 (see FIGS. 6 and 7). It is noted that while, at that time, the narrow beam of light serving to inspect the ampoule is passed through the inspecting station this beam of light does not affect the photosensitive device because the latter is disposed out of the path of such a beam.

The output current from the photosensitive device is fed into a comparing and balancing circuit such as shown in FIG. 14, for the purpose of comparing the same with a reference and maintaining the sensitivity of the device constant. More specifically, the output from the photosensitive device 62 is applied to a contact of a direct to alternating current converting chopper 105 having the other contact to which a reference source 106 is connected. The chopper 105 includes a movable arm 107 adapted to be vibrated between the two contacts when a winding 108 is energized by a suitable source of alternating current (not shown) through a closed switch S4. The chopper 105 when operated compares the voltages at both contacts with each other. A difference therebetween, if present, is amplified by a suitable pulse amplifier 109 the output from which is supplied to one field of a balancing reversible motor 110. Then with a switch S5 closed, the motor 110 is rotated until the sensitivity of the photosensitive device 62 reaches a predetermined value. In FIG. 14, the motor is shown as controlling a voltage across two adjacent dynodes of a photoelectron multiplier 62.

From the foregoing, it will be apparent that automatic correction of the sensitivity of the photosensitive device is effected once for each complete rotation of the turntable for a short period of time (for which the switches S4 and S5 are closed) and that during the next rotation of the turntable ampoules are inspected on the basis of the sensitivity corrected in the immediately preceding correction step.

It is noted that, in order to prevent an ampoule from being fed to the position of the ampoule holding array where the holder device is not provided, an electromagnet 111 (see FIGS. 1 and 2) is provided to pull out a pin (not shown) from the grooved cam 20 for the distributor device 19.

The circuit shown in FIG. 14 is very effective for controlling the characteristics of the replaced source of light and of the replaced photosensitive device.

It is noted that a pair of turntables 11 shown in FIG. 1 effects alternately intermittently rotational movement and that ampoules loaded on one of the turnables are inspected within a period of time during which the other turntable is rotating. Therefore, one set of the various electronics circuits as previously described can be used for both turntables by any suitable switching means (not shown). It has been found that ampoules can be inspected at a rate of 30 to 60 ampoules per minute for each turntable and hence 60 to 120 ampoules per minute for both turntables.

From the foregoing it will be appreciated that the objects of the invention have been accomplished by the provision of an automatic ampoule inspection apparatus of the type in which ampoules are smoothly and quietly transferred in the inspecting station one after another, only scattered and reflected light due to the ampoules and its contents being separately discriminated in terms of foreign matters in the contents and of causes not affecting the contents with an improved accuracy and a high sensitivity which is maintained substantially constant by special means. Also there has been provided an ampoule holder device of simple construction capable of firmly holding an ampoule and easily removing the same in very simple manner and ensuring an improved accuracy because of accurate centering of the held ampoule. Further, the utilization of air under pressure and a brake rod facilitates initiation and abrupt termination of rotational movement of the ampoule held by the device.

While the invention has been described in conjunction with certain preferred embodiments thereof it is to be understood that various modifications and changes may be made without departing from the spirit and scope of the invention. For example, semiconductor devices may be used in the electronic circuitry, if desired.

What we claim is:

1. An apparatus for automatically inspecting ampoules comprising, in combination, a turntable for delivering ampoules to an inspection position; a drive for rotating said turntable step-by-step, a plurality of ampoule holder devices for holding ampoules in circular array disposed angularly spaced at equal intervals on a peripheral portion of said turntable, said angular interval being equal to an angle through which said turntable steps each time it is stepped, each of said ampoule holder devices including expandable jaws having a tapered outer face, an annular spring seat abutting against said outer face of the expandable jaws, a spring for urging said spring seat toward the end of the jaws and tending to press the jaws inwardly to hold an ampoule firmly, and for said holder device is a windmill a shaft connecting the jaws to said windmill; a loading device for loading the ampoules into said holder devices one after another as said turntable is rotated step-by-step; an air nozzle disposed ahead of the ampoule inspecting position to direct air under pressure to the windmill of said holder devices to thereby rotate each holder device together with the ampoule held by the same in preparation for inspection at said inspection position; a brake device at the ampoule inspecting position to abruptly stop rotation of each holder device and the ampoule therein and permitting the contents of the ampoule to continue to rotate, a source of light at said ampoule inspecting position for directing a narrow parallel beam of light into the ampoules held by the holder devices, said source of light including an incandescent lamp, a collimating lens disposed in the front of said lamp, and a plurality of parallel plates disposed between said lens and the ampoule being inspected and defining aligned central slits corresponding in length and width to the beam of light to be projected on the individual ampoules; a photoelectric tube disposed in a position behind individual ampoules being inspected and at an angle of from 20 to 30 degrees with respect to the direction of the beam of light incident upon the ampoule; a focusing lens disposed between the ampoule being inspected and said photosensitive means to form an inverted real image for the longitudinal central section of the ampoule taken in a plane perpendicular to the direction of the beam of light incident upon said ampoule being inspected, a light shielding plate disposed in a plane where said inverted real image is formed and at a position in which an inverted real image for the free surface of the contents of the ampoule being inspected is shielded from the photosensitive means; a discriminating circuit connected to the output of the photoelectric tube to extract from the output current from said tube pulse component caused by that portion of light scattered by and reflected from foreign matter particles contained in the content of the ampoule being inspected and to compare said component with a predetermined reference level, a finding circuit connected to the output of the photoelectric tube to extract from the output current from said tube a direct current component caused by that portion of light scattered by the wall of the ampoule being inspected and to compare the same with a predetermined reference level, a pair of memory circuits connected to said discriminating and finding circuits respectively to store the comparison information until the inspected ampoules are transferred to an unloading position; an unloading device defining said unloading position to unload the ampoules from said holder devices, and a sorting device for sorting the inspected ampoules in accordance with said comparison information.

2. An apparatus as claimed in claim 1, comprising a wetting device disposed ahead of the inspecting position for preliminarily wetting of the individual ampoule with a liquid having a property of effectively wetting the ampoules in order to improve the light permeability thereof.

3. An apparatus as claimed in claim 2, comprising a wetting device disposed ahead of said inspecting position for preliminarily wetting of the individual ampoules with a liquid having a property of effectively wetting the ampoules in order to improve the light permeability thereof.

4. An apparatus as claimed in claim 1, comprising an air nozzle disposed at said ampoule inspection position to direct air under pressure to said windmill of said holder devices to vary the angular position of the ampoule held by the individual devices with respect to the beam of light incident upon the individual ampoules.

5. An apparatus for automatically inspecting ampoules, comprising, in combination, a turntable; a drive for rotating said turntable step-by-step, a plurality of ampoule holder devices in a circular array, disposed at angularly equal intervals on a peripheral portion of said turntable except for one pair of adjacent holder devices spaced an angular distance equal to twice one of said angular interval, said angular interval being equal to an angle through which said turntable steps each time, each of said ampoule holder devices including expandable jaws having a tapered outer face, an annular spring seat abutting against said outer face of the expandable jaws, each holder device comprising a spring for urging said spring seat toward the tapered end of the jaws and tending to press the jaws inwardly to hold an ampoule therein firmly, and windmill means, a shaft connecting said jaws to said windmill, a loading device for loading the ampoules into said holder devices one after another as said turntable is rotated stepwise; an air nozzle disposed ahead of an ampoule inspecting position to direct air under pressure to said windmill means of said holder devices to thereby rotate the holder devices together with the ampoule held therein, a brake device disposed at said ampoule inspecting position to abruptly stop the rotation of each of said holder devices and permitting the content of the ampoules to rotate independently of the ampoules, a source of light at said inspecting position for directing a narrow parallel beam of light to the ampoule held by a respective holder device, said source of light including an incandescent lamp, a collimating lens disposed in the front of said lamp, and a plurality of parallel plates disposed between said lens and the ampoules being inspected and defining aligned central slits corresponding in length and width to the beam of light to be projected on the individual ampoules being inspected; a photoelectric tube disposed in position behind the individual ampoules being inspected and at an angle of from 20 to 30 degrees with respect to the direction of the beam of light incident upon the individual ampoules being inspected; a focusing lens disposed between the individual ampoule being inspected and said photosensitive means to form an inverted real image for the longitudinal central section of the individual ampoule taken in a plane perpendicular to the direction of the beam of light incident upon the individual ampoule, a light shielding plate disposed in a plane where said inverted real image is formed and at such a position that an inverted real image for the free surface of the content of the individual ampoules are shielded from the photosensitive means; said source of light further including means for directing another beam of light directly to said photoelectric tube when the individual holder device reaches said ampoule inspecting position; a discriminating circuit connected to the output of the photoelectric tube to extract from the output current from said tube pulsating current component caused by that portion of light scattered by and reflected from foreign matter particles contained in the contents of the individual ampoules and to compare the same with a predetermined reference level, a finding circuit connected to the output of the photoelectric tube to extract from the output current from said tube a direct current component caused by that portion of light scattered by the wall of the individual ampoules and to compare the output with a predetermined reference level, a pair of memory circuits connected to said discriminating and finding circuits respectively to store the comparison information until the inspected ampoules are transferred to an ampoule unloading position, an unloading device at said ampoules unloading position to unload the ampoule from the holder devices; a sorting device for sorting the inspected ampoules in accordance with said comparison informations; control means connected to the output of the photoelectric tube and operable to compare a direct current output from said tube produced by said another beam of light with a reference level, to thereby control the sensitivity of the photoelectric tube to maintain the same substantially constant.

6. An apparatus as claimed in claim 5, comprising an air nozzle disposed at the ampoule inspection position to direct air under pressure to said windmill of said holder devices to vary the angular position of the individual ampoules held by the holder devices with respect to the beam of light incident upon the individual ampoules.

References Cited by the Examiner
UNITED STATES PATENTS

| | | | |
|---|---|---|---|
| 1,792,046 | 2/1931 | Skaupy | 88—24 X |
| 2,531,529 | 11/1950 | Price. | |
| 2,593,311 | 4/1952 | Johnson. | |
| 2,604,809 | 7/1952 | Mitchell | 250—222 X |
| 2,733,357 | 1/1956 | Warren | 250—207 |
| 3,005,548 | 10/1961 | Flanders | 209—111.5 |

M. HENSON WOOD, Jr., *Primary Examiner.*

ROBERT B. REEVES, SAMUEL F. COLEMAN,
*Examiners.*